US010206099B1

(12) United States Patent
Trinh et al.

(10) Patent No.: US 10,206,099 B1
(45) Date of Patent: Feb. 12, 2019

(54) GEOLOCATION-BASED TWO-FACTOR AUTHENTICATION

(71) Applicant: Symantec Corporation, Mountain View, CA (US)

(72) Inventors: Brandon Trinh, Irvine, CA (US); Christopher Ray, Los Angeles, CA (US); Chotima Srichankrad, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 188 days.

(21) Appl. No.: 14/815,183

(22) Filed: Jul. 31, 2015

(51) Int. Cl.
*H04W 4/02* (2018.01)
*H04W 12/06* (2009.01)
*H04L 29/06* (2006.01)
*H04L 29/08* (2006.01)

(52) U.S. Cl.
CPC ............. *H04W 12/06* (2013.01); *H04L 63/08* (2013.01); *H04L 63/107* (2013.01); *H04L 67/18* (2013.01); *H04W 4/02* (2013.01)

(58) Field of Classification Search
CPC ....... H04W 12/06; H04W 4/02; H04W 4/025; H04L 63/08; H04L 63/107; H04L 67/18
See application file for complete search history.

(56) References Cited

U.S. PATENT DOCUMENTS

| | | | | |
|---|---|---|---|---|
| 8,561,142 B1* | 10/2013 | Sobel | ...................... | G06F 21/00 709/203 |
| 9,075,979 B1* | 7/2015 | Queru | ...................... | G06F 21/34 |
| 9,380,562 B1* | 6/2016 | Vetter | ...................... | H04L 63/08 |
| 9,525,972 B2* | 12/2016 | Raounak | ............... | H04W 4/029 |
| 2010/0024017 A1* | 1/2010 | Ashfield | ................ | G06F 21/35 726/7 |
| 2014/0282877 A1* | 9/2014 | Mahaffey | ............ | H04L 63/0853 726/3 |
| 2015/0215299 A1* | 7/2015 | Burch | ...................... | H04L 63/08 726/5 |
| 2015/0242616 A1* | 8/2015 | Oprea | ................... | G06F 21/445 726/1 |
| 2015/0256973 A1* | 9/2015 | Raounak | ............... | H04W 4/029 726/7 |
| 2016/0048900 A1* | 2/2016 | Shuman | ............. | G06Q 30/0631 705/7.33 |
| 2016/0358139 A1* | 12/2016 | Keys | .................. | G06Q 20/1085 |

* cited by examiner

*Primary Examiner* — Linglan E Edwards
(74) *Attorney, Agent, or Firm* — Patterson + Sheridan, LLP

(57) ABSTRACT

Techniques disclosed herein provide a geolocation-based two-factor authentication process. An authentication service receives a first authentication factor associated with an account. Upon validating the first authentication factor, the authentication service requests a second authentication factor from an application executing on a mobile device associated with the account. The second authentication factor identifies at least a location of the mobile device. The authentication service determines a location of the client device. Upon determining that the locations of the mobile device and of the client device are within a specified proximity of one another, the authentication service grants access to the account.

17 Claims, 6 Drawing Sheets

GEOLOCATION-BASED TWO-FACTOR AUTHENTICATION

BACKGROUND

Field

Embodiments presented herein generally relate to user authentication, and more specifically, to two-factor authentication techniques based on location of a device representing the one of the factors.

Description of the Related Art

Two-factor authentication (2FA) generally refers to a method where a user is authenticated using a combination of two factors. Typically, the two factors have distinct properties associated with an individual, such as a bankcard (something the individual has) and a personal identification number (PIN) (something the individual knows). If the bankcard is lost or stolen, it cannot be used without the PIN. Another common application of two-factor authentication is based on a set of credentials of a user (e.g., a username and a password) and a device of the user. The device may generate a security code (e.g., a random sequence of numbers) at specified intervals. An enterprise network that uses a 2FA service to authenticate a user on a client computer may prompt the user to provide a username and password. After successfully validating the username and password, the service may validate the security code generated by the device. The service grants access to the user upon success.

2FA provides a number of significant advantages over using only one component for authentication. For instance, because the security code is dynamically generated and by definition only used once, such passwords are generally safer than fixed authentication information. Further, using an item that the user possesses as a second authentication factor, such as a device that generates a sequence of random numbers at a specified interval, provides added security (as opposed to using only what the user knows).

However, although 2FA can provide higher security for a user and a network, some users are reluctant to enable 2FA due to inconvenience. For example, after entering a username and password, the user might not be willing to carry around an additional security device. And thus, rather than log into a network or service through 2FA methods each time, the user might disable 2FA altogether. As a result, the user's account may be more vulnerable to attacks.

SUMMARY

One embodiment presented herein includes a method, which includes receiving a first authentication factor associated with an account. The first authentication factor is used with a second authentication factor associated with the account to authenticate a user in response to a request from a client device to access the account. Upon validating the first authentication factor, the second authentication factor is requested from an application executing on a mobile device associated with the account. The second authentication factor identifies at least a location of the mobile device. This method also includes determining a location of the client device, and upon determining that the locations of the mobile device and of the client device are within a specified proximity of one another, granting access to the account.

Another embodiment includes a non-transitory computer-readable storage medium having instructions, which, when executed on a processor, performs an operation. The operation itself includes receiving a first authentication factor associated with an account. The first authentication factor is used with a second authentication factor associated with the account to authenticate a user in response to a request from a client device to access the account. Upon validating the first authentication factor, the second authentication factor is requested from an application executing on a mobile device associated with the account. The second authentication factor identifies at least a location of the mobile device. This operation may also include determining a location of the client device and upon determining that the locations of the mobile device and of the client device are within a specified proximity of one another, granting access to the account.

Still another embodiment includes a system having a processor and a memory storing program code, which, when executed on the processor, performs an operation. The operation itself includes receiving a first authentication factor associated with an account. The first authentication factor is used with a second authentication factor associated with the account to authenticate a user in response to a request from a client device to access the account. Upon validating the first authentication factor, the second authentication factor is requested from an application executing on a mobile device associated with the account. The second authentication factor identifies at least a location of the mobile device. This operation may also include determining a location of the client device and upon determining that the locations of the mobile device and of the client device are within a specified proximity of one another, granting access to the account.

DETAILED DESCRIPTION

Figure 1:
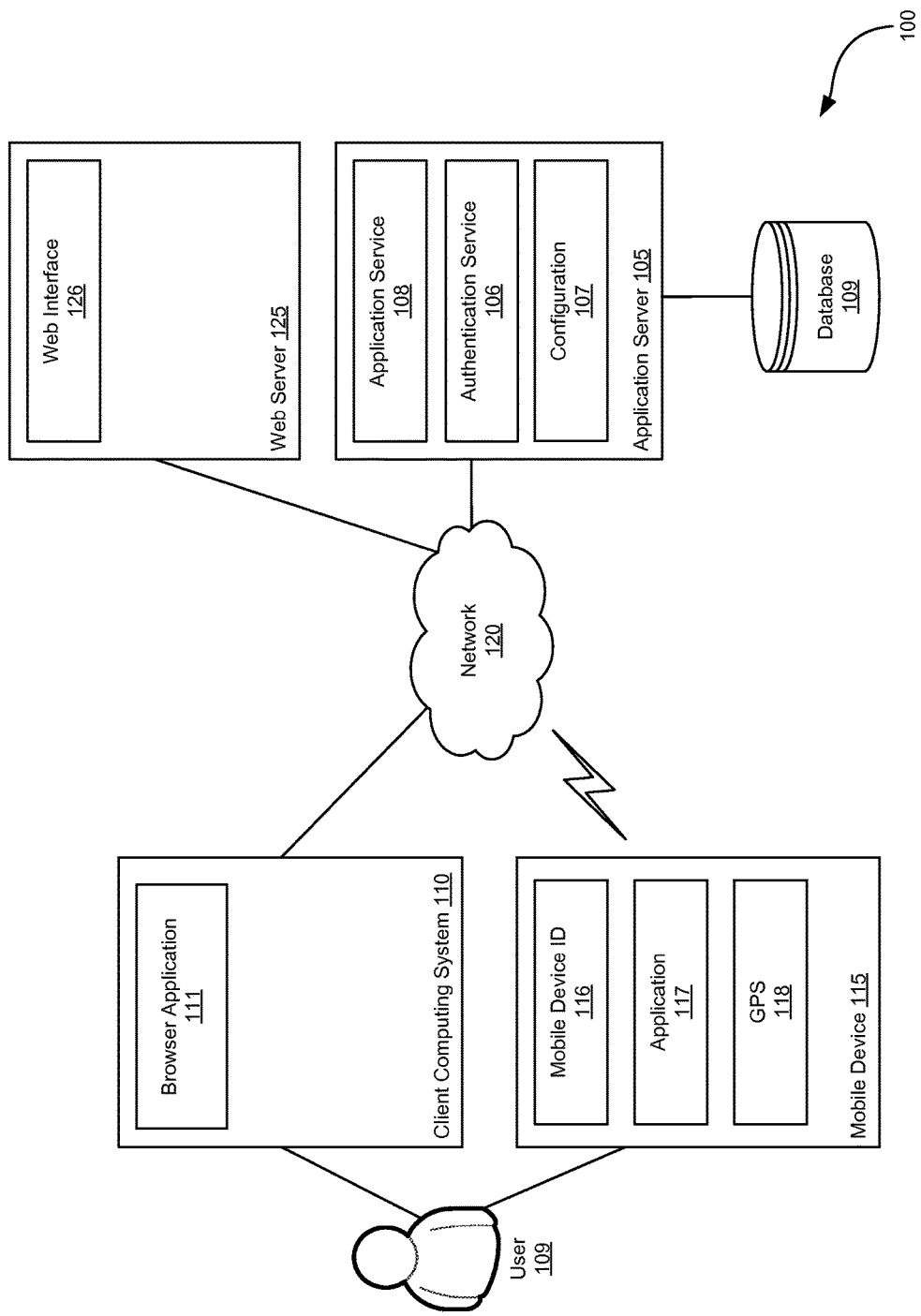
FIG. 1 illustrates an example computing environment, according to one embodiment.

Embodiments presented herein describe techniques for providing geolocation-based two-factor authentication (2FA) to a user. In particular, the techniques allow a user to access a server that uses 2FA based on the location of a second computing device (e.g., a mobile device, such as a smartphone) relative to the location of a client computer to transparently provide the second authentication factor.

In one embodiment, a server may provide access to clients through 2FA methods. For example, an authentication service hosted on an enterprise network may identify users based on a set of credentials (e.g., a username and password combination) and a second authentication factor, such as a mobile device executing an application that can communicate with the authentication service.

To address inconvenience of the user needing to wait to receive a security code on the mobile device and providing the code to the server, the server may use the location of the mobile device relative to the location of the login request to authenticate the user. As stated, the mobile device is associated with the user's account. Provided that the mobile device is within a specified range of the origin of the login request, the server can validate a user session through 2FA using the location of the mobile device to ascertain that the user possesses the second component (i.e., the mobile device).

In one embodiment, a user requesting access to the enterprise network provides the server with access credentials via a client computing system. For example, the user may do so through a login interface in a web browser. In turn, the server determines whether the credentials are valid. Upon success, the server requests the location of the mobile device. For example, the server can send the request to a message bus service (e.g., a push service executing in a cloud network), which in turn sends the request to the mobile device. The mobile device determines its location and sends location information to the server. The server then evaluates the location of the authentication request relative to the location of the mobile device. In the event that the locations match within a specified range, the server then validates the user session and grants the user access to the network. However, in the event that the locations do not match, the server can default to traditional 2FA methods (e.g., by generating a security code and sending the code to the associated mobile device). Otherwise, the server may deny access to the network.

Advantageously, techniques described herein provide 2FA techniques using the geolocation of the second authentication factor (e.g., a mobile device associated with the user) to validate an authentication session. That is, rather than require the user to enter a security code or require the user to carry an additional security device each time the user logs in, the server instead correlates location information of the authentication request and the mobile device. This approach provides ease-of-use to the user by allowing a seamless logon using 2FA. Further, the techniques described herein may be used in any location, as the location being evaluated by the server is relative to the locations of the mobile device and the authentication request.

FIG. 1 illustrates an example computing environment 100, according to one embodiment. As shown, the computing environment 100 includes an application server 105, a web server 125, a user 109, a client computing system 110, a mobile device 115, and a network 120.

In one embodiment, the application server 105 includes an application service 108, an authentication service 106, a configuration 107, and a database 109. The application server 105 may be representative of a server in an enterprise network. The application service 108 may provide a variety of web-based services (e.g., an enterprise portal service that provides user access to files in the database 109) for the client computing system 110. The application server 105 can be interconnected with other servers (not shown) in the enterprise network. The application server 105 may be a physical computing instance or a virtual machine instance (e.g., executing in the cloud).

In one embodiment, the web server 125 includes a web interface 126. The web server 125 may be representative of a server in the enterprise network. The web interface 126 provides web pages generated by the authentication service 106 and the application service 108. For example, the web interface 126 may present a login portal generated by the authentication service 106 to a browser application 111 executing on the client computing system 110. The login interface allows the user 109 to submit credentials (e.g., a username and password) to the application service 108.

The mobile device 115 includes a mobile device ID 116, an application 117, and a global positioning system (GPS) 118. The authentication service 106 may associate the mobile device ID 116 with a particular user account in the configuration 107. Further, the application 117 communicates with the authentication service 106, e.g., to transmit location information to the authentication service 106. The GPS 118 determines location and time information using GPS satellites. In one embodiment, the mobile device 115 is a smartphone.

The authentication service 106 verifies the authority of a user 109 connecting to the enterprise network. The configuration 107 may specify account information (e.g., a username, an encrypted password, mobile device IDs associated with the user account, application IDs associated with the user account, etc.). The authentication service 106 may evaluate credentials supplied by the user 109 (e.g., via a browser application 111 executing on the client computing system 110) against information provided in the configuration 107 to verify the identity of the user 109.

Further, the authentication service 106 may require two-factor authentication (2FA) to further verify the identity of the user. In one embodiment, the authentication service 106 verifies a user identity by using the reported location of the mobile device 115 to determine whether the user is in proximity of the mobile device 115 when requesting access to the application server 105. For example, an administrator of the enterprise network may configure the account of the user 109 such that geolocation-based 2FA is enabled. If enabled, the authentication service 106 may attempt to obtain the second factor for authentication from the mobile device 115 (e.g., associated with the account). To do so, the authentication service 106 may send a request to the application 117 of the mobile device 115 via a messaging bus service The messaging bus service may be a service that receives messages from a sender and makes the messages available for download by the targeted recipient. The application 117 may receive the message from the messaging bus service indicating the request for the location. The application 117 retrieves the location of the mobile device 115 via the GPS 118 and sends the location to the authentication service 106 (e.g., via the messaging bus service). Once received, the authentication service 106 compare the location of the mobile device 115 with the location of the authentication request (e.g., obtained through various sources, such as the IP address, wireless network mappings, etc.). If the locations are within a specified range of one another, the authentication service 106 grants the user 109 access to the application server 105.

Figure 2:
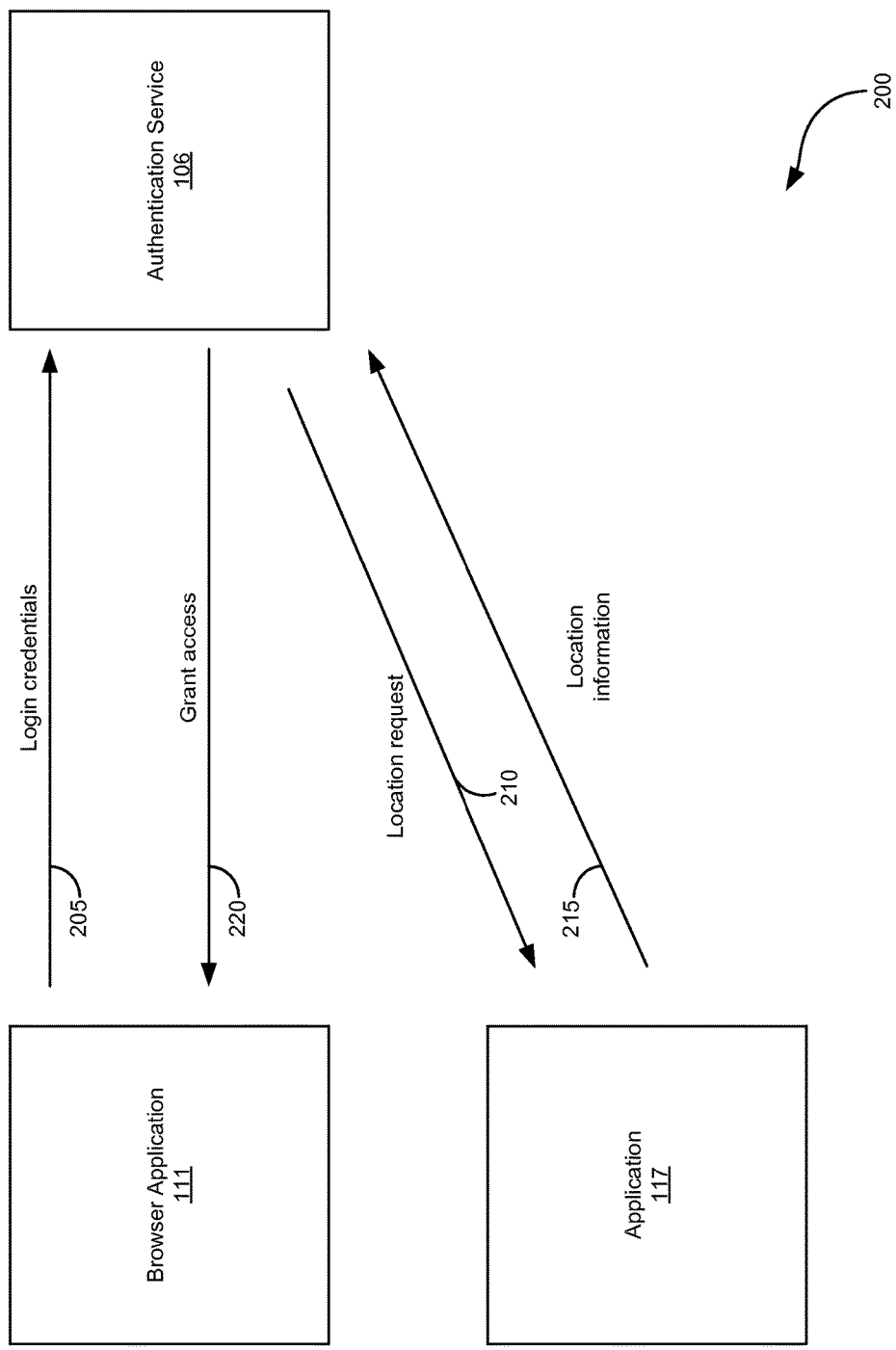
FIG. 2 illustrates an example component diagram for providing geolocation-based two-factor authentication, according to one embodiment.

FIG. 2 illustrates an example diagram 200 of components configured to provide geolocation-based two-factor authentication, according to one embodiment. In particular, the diagram 200 depicts interactions between the browser application 111, the mobile device 115, and the authentication service 106. The interactions occur when the user 109 attempts to access, via the browser application 111, the application service 108. The browser application 111 sends credentials (e.g., a username and password) to the application service 108, which verifies the credentials through the authentication service 106 (at 205). In one embodiment, prior to doing so, the browser application 111 may determine whether a cookie (e.g., associated with the browser application 111 in a previously validated 2FA exchange) is present to determine whether the client computing system 110 is a trusted device where location-based 2FA is enabled. That is, an enterprise network may require initially access the application service 108 using traditional 2FA prior to using location-based 2FA. Doing so creates additional security, e.g., placing the cookie after initial authentication may prevent IP spoofing attacks by malicious actors.

The authentication service 106 evaluates the submitted credentials with account information associated with the user. The authentication service 106 may also determine whether a mobile device is associated with the account. In such a case, the authentication service 106 requests the location of the mobile device (at 210). As stated, to do so, the authentication service 106 may communicate with the application 117 executing in the mobile device 115 via a message bus service that pushes sender messages to target recipients. The authentication service 106 may send the location request as a message to the application 117 over the message bus. In turn, the application 117 receives the location request. The application 117 determines the location of the mobile device 115 via the GPS 118 and transmits the location information to the authentication service 106 (at 215).

The authentication service 106 receives the location information from the application 117. In addition, the authentication service 106 determines the location information of the login request originating from the browser application 111. To do so, the authentication service 106 can evaluate various factors associated with the request, such as an IP address, a wireless network that the client computing system 110 is connected to, etc. The authentication service 106 can then evaluate both the location information of the mobile device 115 and the location information of the login request. The authentication service 106 may determine, from the evaluation, whether the locations of the mobile device 115 and the login request are within a specified radius of one another. If so, then the authentication service 106 grants access to the protected resource, e.g., the application service 108, to the user 109 (at 220). Otherwise, the authentication service 106 may restrict access from the user 109. However, the authentication service 106 may also authenticate the user 109 by using other second factor. For example, the authentication service 106 may generate a security code (e.g., a one-time password (OTP)) and send the code to a device associated with the account, such as the mobile device 115 (a second component). The user then supplies the code (e.g., via the browser application 111) to the server to validate the session.

In one embodiment, the authentication service 106 may also restrict access to the network to users logging in from a trusted geographical location (e.g., corresponding to an enterprise headquarters). Doing so provides additional security for the network by ensuring that the user is logging in from an authorized location. When evaluating the login request and the mobile device, the authentication service 106 may determine that the locations are outside of a specified radius of the authorized location. In such a case, the authentication service 106 may deny access to the user and transmit an error to the browser application 111.

Figure 3:
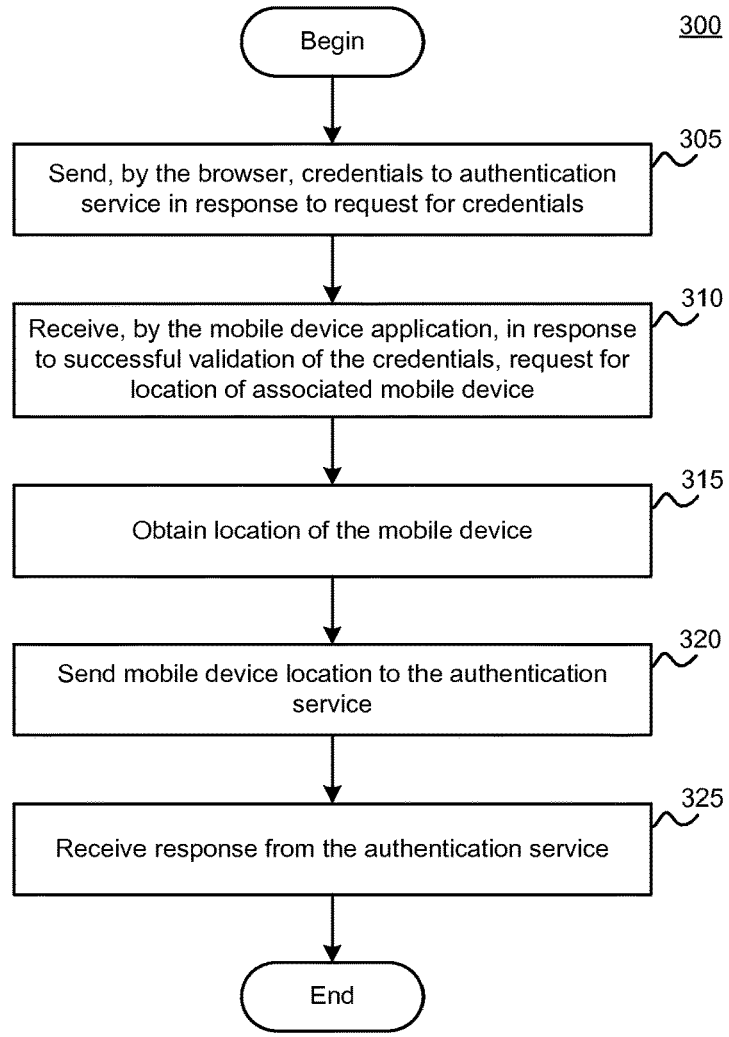
FIG. 3 illustrates a method for accessing a server with geolocation-based two-factor authentication enabled, according to one embodiment.

FIG. 3 illustrates a method 300 for accessing a server with geolocation-based two-factor authentication enabled, according to one embodiment. More specifically, method 300 describes accessing a web-based distributed application (e.g., application service 108) that can be accessed from any system connected to the Internet (e.g., by the client computing system 105 via browser application 111). Of course, the techniques described herein may apply to other types of distributed applications, such as client applications that access a server, where the server requires authentication. In this method 300, it is assumed that the account associated with user 109 has location-based two-factor authentication enabled.

As shown, method 300 begins at step 305, where the browser application 111 sends credentials (e.g., a username and password combination) to the authentication service 106. The browser application 111 may do so in response to a request from the authentication service 106 (e.g., after the browser application 111 initiates a login request to an account). The browser application 111 may send the credentials via a login interface provided by the application server 105.

At step 310, the application 117 receives a request for the location of the mobile device 115 associated with the account. The application 117 may receive the request in response to a successful validation of the credentials by the authentication service 106. The application 117 may receive the request as a push notification from a messaging bus service. At step 315, the application 117 obtains the location of the mobile device 115 via the GPS 118. In turn, the mobile device 115 sends the location information to the browser application 111. Similarly, the mobile device 115 may do so via the messaging service used by the browser application 111.

At step 320, the application 117 (or alternatively, the mobile device 115) sends the mobile device location information to the authentication service 106. As stated, the authentication service 106 compares the mobile device location information with the location information of the request. Doing so allows the authentication service 106 to determine whether the location of the mobile device is within a specified radius of the request location. Once determined, the authentication service 106 grants access to the network. However, the authentication service 106 may also determine that the locations are not within a specified radius. In either case, the authentication service 106 sends a response to the browser application 111 indicating the determination. At step 325, the browser application 325 receives the response.

Figure 4:
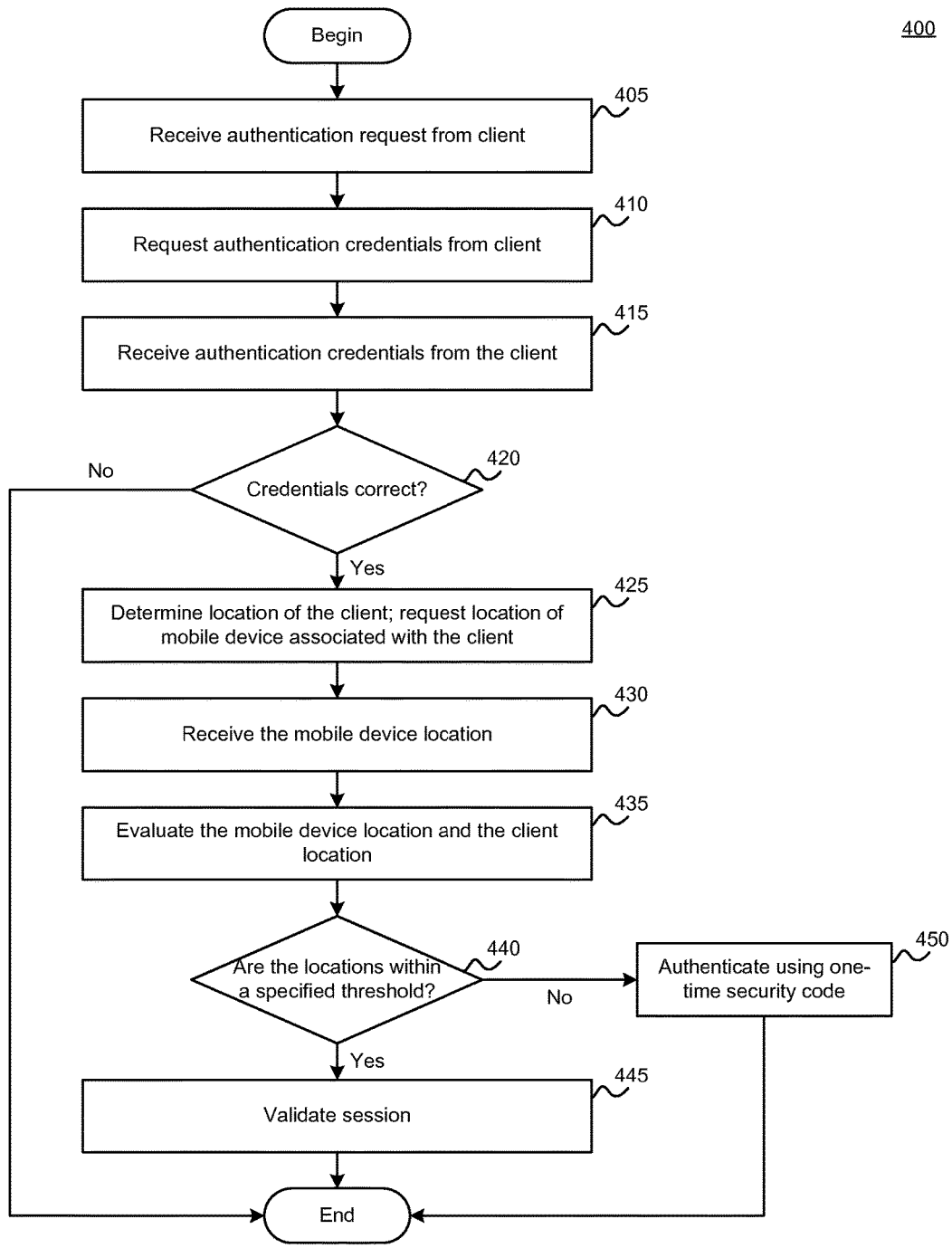
FIG. 4 illustrates a method for authenticating a user through geolocation-based two-factor authentication, according to one embodiment.

FIG. 4 illustrates a method 400 for authenticating a user through geolocation-based two-factor authentication, according to one embodiment. More specifically, method 400 describes the authentication exchange from the perspective of the authentication service 106 handling an authentication request for an account where geolocation-based 2FA is enabled.

As shown, method 400 begins at step 405, where the authentication service 106 receives a request to authenticate the client. In turn, at step 410, the authentication service 106 sends a request to the client for valid credentials, such as a username and password combination.

At step 415, the authentication service 106 receives the credentials from the client. The authentication service 106 evaluates the credentials. At step 420, the authentication service 106 determines whether the credentials are correct. If not, method 400 ends. Otherwise, the authentication service 106 then determines the location of the client making the login request. If location-based 2FA is enabled with the account, then the authentication service 106 also evaluates the user account to identify a mobile device associated with the account. The authentication service 106 requests the location of the associated mobile device from the application 117 (e.g., via the message bus service that pushes the request to the application 117).

At step 430, the authentication service 106 receives the location information of the mobile device 115. At step 435, the authentication service 106 compares the mobile device location and the client location. That is, the authentication service 106 calculates the distances between the mobile device and the client locations to determine whether the mobile device and the client sending the authentication request are within a specified threshold distance of one another (at step 440). If so, then at step 445, the authentication service 106 validates the login session for the client, granting access to the network. Otherwise, then at step 450, the authentication service 106 defaults to other 2FA methods. For example, the authentication service 106 may generate a one-time security code and send the security code to the associated mobile device 115.

Figure 5:
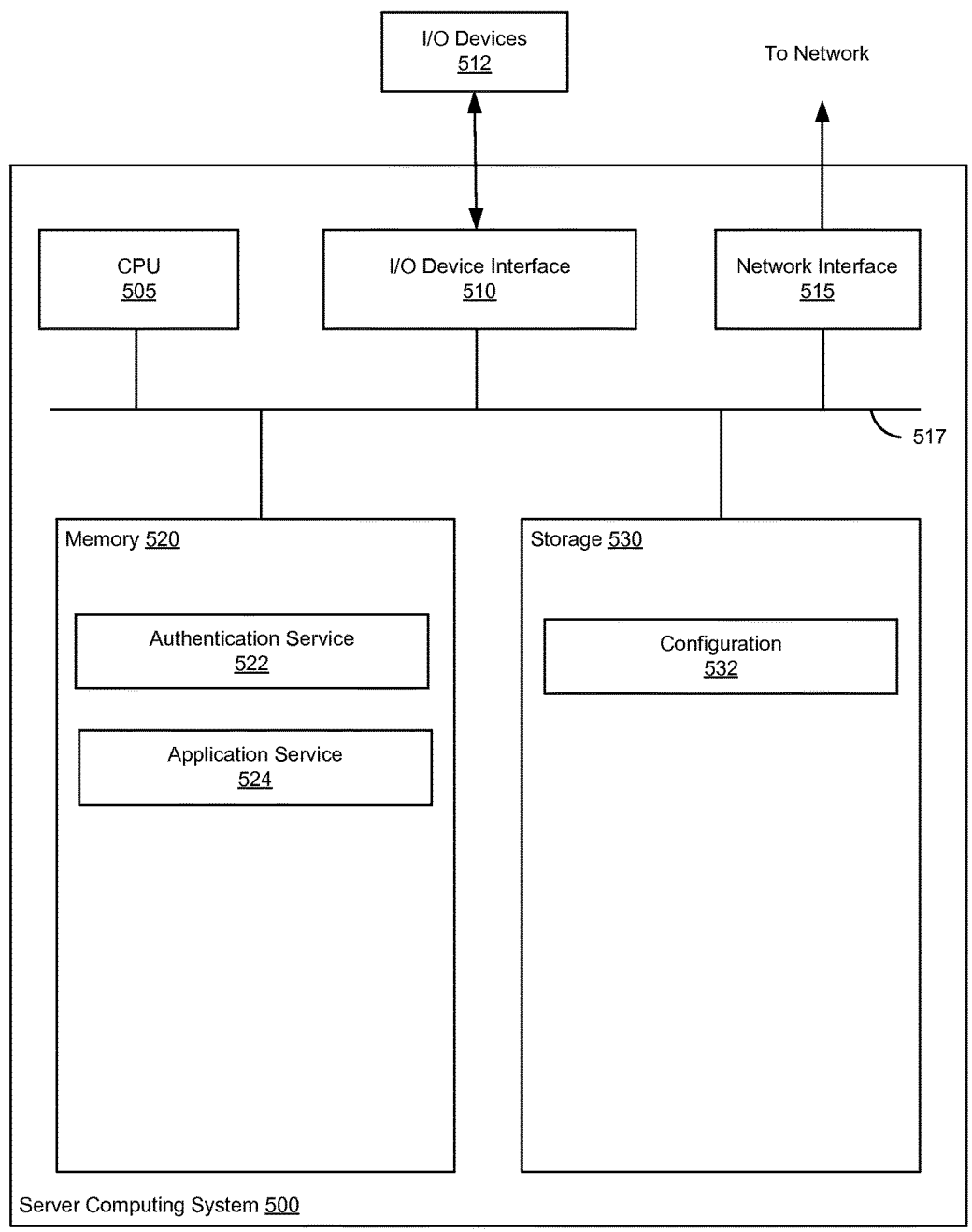
FIG. 5 illustrates an example server computing system configured to authenticate a user through geolocation-based two-factor authentication, according to one embodiment.

FIG. 5 illustrates an example server computing system 500 configured to authenticate a user through location-based two-factor authentication, according to one embodiment. As shown, computing system 500 includes, without limitation, a central processing unit (CPU) 505, a network interface 515, a memory 520, and storage 530, each connected to a bus 517. The server computing system 500 may also include an I/O device interface 510 connecting I/O devices 512 (e.g., keyboard, display, mouse devices, etc.) to the server computing system 500. Further, in context of the present disclosure, the computing elements shown in the computing system 500 may correspond to a physical computing system (e.g., a system in an enterprise network).

CPU 505 retrieves and executes programming instructions stored in memory 520 as well as stores and retrieves application data residing in the storage 530. The bus 517 is used to transmit programming instructions and application data between CPU 505, I/O devices interface 510, storage 530, network interface 515, and memory 520. Note, CPU 505 is included to be representative of a single CPU, multiple CPUs, a single CPU having multiple processing cores, and the like. Memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

Illustratively, memory 520 includes an authentication service 522 and an application service 524. And storage 530 includes a configuration 532. The authentication service 522 verifies an identity of a user attempting to log into the application service 524. The authentication service 522 may verify the credentials of the user based on account information provided in the configuration 532. In one embodiment, the authentication service 522 provides 2FA based on location of a mobile device associated with a user account. The authentication service 522, in addition to verifying username and password credentials of the user during an authentication session, requests a location of the associated mobile device. The authentication service 522 receives the location of the mobile device and evaluates the location relative to the location of the authentication request. If the locations are within a specified threshold range, the authentication service 522 may validate the user. Further, if the locations are not within a specified threshold range, the authentication service 522 may nevertheless authenticate the user through known 2FA methods, such as by generating a security code (e.g., an OTP) via the code generator 524 and transmitting the code to the mobile device.

Figure 6:
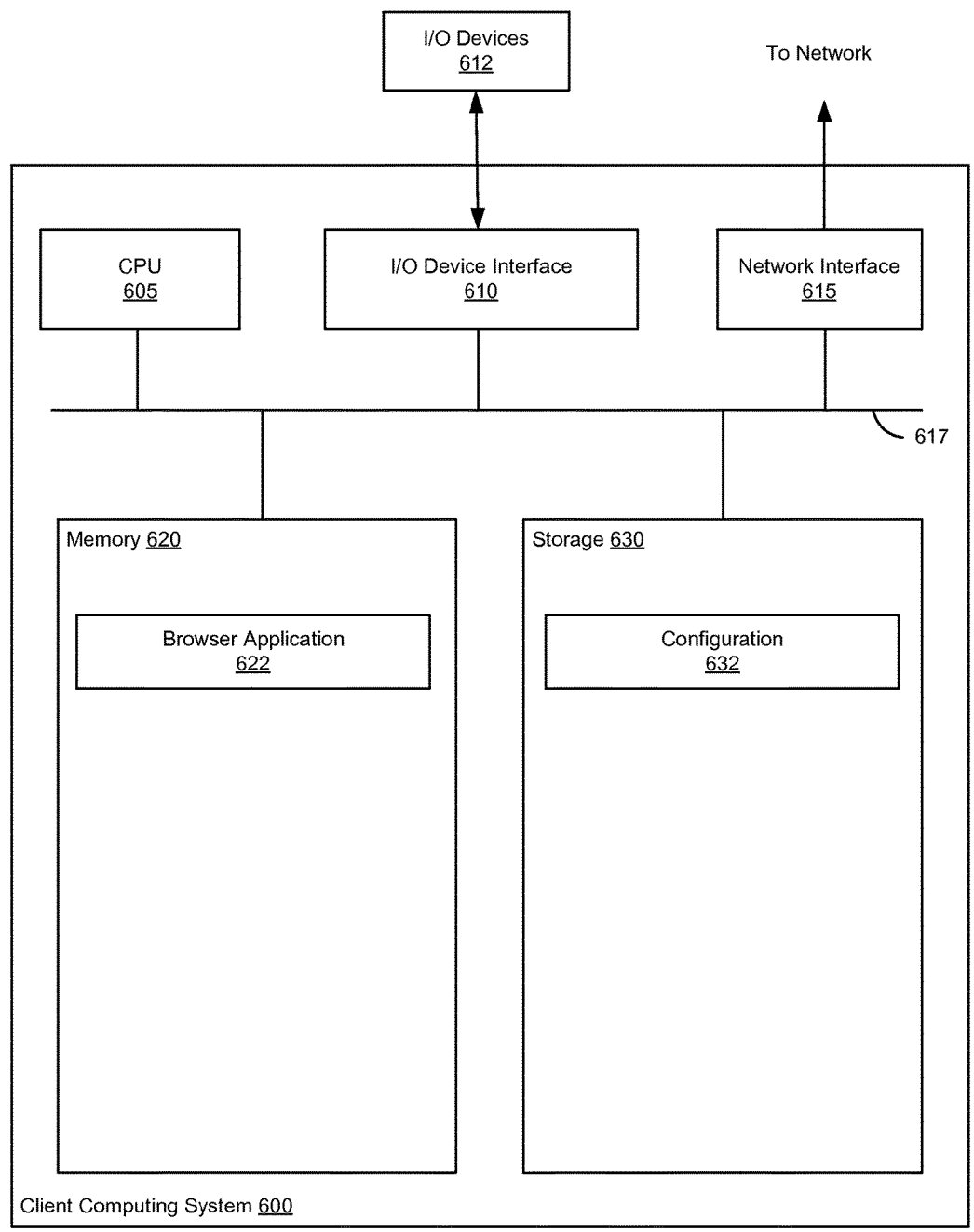
FIG. 6 illustrates an example client computing system configured to access a server with geolocation-based two-factor authentication enabled.

FIG. 6 illustrates an example client computing system 600 configured to access a server with geolocation-based two-factor authentication enabled. As shown, computing system 600 includes, without limitation, a central processing unit (CPU) 605, a network interface 615, a memory 620, and storage 630, each connected to a bus 617. The client computing system 600 may also include an I/O device interface 610 connecting I/O devices 612 (e.g., keyboard, display, mouse devices, etc.) to the client computing system 600. Further, in context of the present disclosure, the computing elements shown in the computing system 600 may correspond to a physical computing system (e.g., a system in an enterprise network).

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a browser application 622. And storage 630 includes a configuration 632. A user may access a login interface to a server (e.g., of an enterprise network) via the browser application 622. The browser application 622 may submit to the login interface user credentials during an authentication session. The server may evaluate the location of the browser application 622 with the location of a mobile device associated with the user account and determine whether the locations are within a specified proximity of one another. If so, the server may grant access to the server.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
transmitting, to a client device, an indication that location-based two-factor authentication is allowed based on a previously validated exchange with the client device;
receiving a first authentication factor associated with an account, wherein the first authentication factor is used with a second authentication factor associated with the account to authenticate a user in response to a request from the client device to access the account;
upon validating the first authentication factor and the transmitted indication, requesting the second authentication factor from an application executing on a mobile device associated with the account, wherein the second authentication factor identifies at least a location of the mobile device;
determining a location of the client device by evaluating a wireless network to which the client device is connected; and
upon determining that the location of the mobile device is outside of a predefined radius of a trusted geographical location and that the location of the client device is outside of the predefined radius of the trusted geographical location, denying access to the account.

2. The method of claim 1, further comprising, upon determining that the locations of the mobile device and of the client device are outside of the predefined radius of the trusted geographical location:
generating a temporary security code; and
transmitting the temporary security code to the mobile device for the application.

3. The method of claim 1, wherein determining the location of the client device comprises:
evaluating an IP address associated with the request to access the account.

4. The method of claim 1, wherein the mobile device is a smartphone.

5. The method of claim 1, wherein the application retrieves the location of the mobile device using a global positioning system (GPS) of the mobile device.

6. The method of claim 1, wherein the first authentication factor is a username and a password.

7. A non-transitory computer-readable storage medium having instructions, which, when executed on a processor, cause the processor to perform an operation comprising:
transmitting, to a client device, an indication that location-based two-factor authentication is allowed based on a previously validated exchange with the client device;
receiving a first authentication factor associated with an account, wherein the first authentication factor is used with a second authentication factor associated with the account to authenticate a user in response to a request from the client device to access the account;
upon validating the first authentication factor and the transmitted indication, requesting the second authentication factor from an application executing on a mobile device associated with the account, wherein the second authentication factor identifies at least a location of the mobile device;
determining a location of the client device by evaluating a wireless network to which the client device is connected; and
upon determining that the location of the mobile device is outside of a predefined radius of a trusted geographical location and that the location of the client device is outside of the predefined radius of the trusted geographical location, denying access to the account.

8. The computer-readable storage medium of claim 7, wherein the operation further comprises, upon determining that the locations of the mobile device and of the client device are outside of the predefined radius of the trusted geographical location:
generating a temporary security code; and
transmitting the temporary security code to the mobile device for the application.

9. The computer-readable storage medium of claim 7, wherein determining the location of the client device comprises:
evaluating an IP address associated with the request to access the account.

10. The computer-readable storage medium of claim 7, wherein the mobile device is a smartphone.

11. The computer-readable storage medium of claim 7, wherein the application retrieves the location of the mobile device using a global positioning system (GPS) of the mobile device.

12. The computer-readable storage medium of claim 7, wherein the first authentication factor is a username and a password.

13. A system comprising:
a processor; and
a memory storing program code, which, when executed on the processor, causes the processor to perform an operation comprising:
transmitting, to a client device, an indication that location-based two-factor authentication is allowed based on a previously validated exchange with the client device;
receiving a first authentication factor associated with an account, wherein the first authentication factor is used with a second authentication factor associated with the account to authenticate a user in response to a request from the client device to access the account;
upon validating the first authentication factor and the transmitted indication, requesting the second authentication factor from an application executing on a mobile device associated with the account, wherein the second authentication factor identifies at least a location of the mobile device;
determining a location of the client device by evaluating a wireless network to which the client device is connected; and
upon determining that the location of the mobile device is outside of a predefined radius of a trusted geographical location and that the location of the client device is outside of the predefined radius of the trusted geographical location, denying access to the account.

14. The system of claim 13, wherein the operation further comprises, upon determining that the locations of the mobile device and of the client device are outside of the predefined radius of the trusted geographical location:
generating a temporary security code; and
transmitting the temporary security code to the mobile device for the application.

15. The system of claim 13, wherein determining the location of the client device comprises:
evaluating an IP address associated with the request to access the account.

16. The system of claim 13, wherein the mobile device is a smartphone.

17. The system of claim 13, wherein the application retrieves the location of the mobile device using a global positioning system (GPS) of the mobile device.

* * * * *